(12) United States Patent
Chen

(10) Patent No.: US 10,544,876 B2
(45) Date of Patent: Jan. 28, 2020

(54) SOLENOID VALVE FOR IRRIGATION SYSTEMS

(71) Applicant: Chin-Yuan Chen, Changhua (TW)

(72) Inventor: Chin-Yuan Chen, Changhua (TW)

(*) Notice: Subject to any disclaimer, the term of this patent is extended or adjusted under 35 U.S.C. 154(b) by 57 days.

(21) Appl. No.: 15/956,054

(22) Filed: Apr. 18, 2018

(65) Prior Publication Data
US 2019/0323621 A1 Oct. 24, 2019

(51) Int. Cl.
| | | |
|---|---|---|
| F16K 31/06 | (2006.01) | |
| F16K 27/12 | (2006.01) | |
| A01G 25/02 | (2006.01) | |
| A01G 25/16 | (2006.01) | |
| F16K 31/08 | (2006.01) | |
| F16K 31/02 | (2006.01) | |
| F16K 37/00 | (2006.01) | |
| F16K 47/02 | (2006.01) | |
| F16K 25/00 | (2006.01) | |

(52) U.S. Cl.
CPC .......... *F16K 31/0651* (2013.01); *A01G 25/02* (2013.01); *A01G 25/162* (2013.01); *F16K 25/005* (2013.01); *F16K 27/12* (2013.01); *F16K 31/02* (2013.01); *F16K 31/06* (2013.01); *F16K 31/0644* (2013.01); *F16K 31/0655* (2013.01); *F16K 31/0672* (2013.01); *F16K 31/0675* (2013.01); *F16K 31/08* (2013.01); *F16K 31/082* (2013.01); *F16K 31/084* (2013.01); *F16K 37/0033* (2013.01); *F16K 47/023* (2013.01); *B60Y 2306/09* (2013.01)

(58) Field of Classification Search
CPC ...... F16K 31/02; F16K 31/06; F16K 31/0644; F16K 31/0655; F16K 31/0672; F16K 31/0675; F16K 31/08; F16K 31/082; F16K 31/084; F16K 25/005; F16K 37/0033; F16K 47/023; B60Y 2306/09
USPC .......................................................... 251/65
See application file for complete search history.

(56) References Cited

U.S. PATENT DOCUMENTS

| | | | | |
|---|---|---|---|---|
| 2,993,676 A | * | 7/1961 | Dahl ...................... | F16K 31/404 251/38 |
| 3,476,146 A | * | 11/1969 | Dolter ................... | F16K 31/404 137/601.13 |
| 3,740,019 A | * | 6/1973 | Kessell ............... | F16K 31/0658 251/129.17 |
| 4,981,155 A | * | 1/1991 | Pick ...................... | F16K 31/404 134/166 C |

(Continued)

*Primary Examiner* — Matthew W Jellett
*Assistant Examiner* — Christopher D Ballman
(74) *Attorney, Agent, or Firm* — Che-Yang Chen; Law Offices of Scott Warmuth

(57) ABSTRACT

A solenoid valve for irrigation systems may comprise a gardening tube, a plastic valve piece, a cover and a magnetic member. The gardening tube has a water inlet channel and a water outlet channel which are communicated, and a valve tube vertically extending from the gardening tube has a valve chamber. The valve piece is positioned in the valve chamber. A second connecting tube vertically protruding from the cover has a housing communicated with the valve chamber, and a solenoid coil and a metal ring are respectively disposed on the second connecting tube. The magnetic member has a magnet installed therein, and the magnet has a first magnetic surface and a second magnetic surface at two ends thereof.

12 Claims, 7 Drawing Sheets

(56) References Cited

U.S. PATENT DOCUMENTS

| | | | | |
|---|---|---|---|---|
| 5,333,643 A * | 8/1994 | Gilchrist | ............ | F16K 31/0658 137/605 |
| 5,758,863 A * | 6/1998 | Buffet | ............ | F16K 31/086 251/28 |
| 6,076,550 A * | 6/2000 | Hiraishi | ............ | F16K 31/0655 137/550 |
| 7,637,475 B2 * | 12/2009 | Adams | ............ | H01F 5/02 251/129.01 |
| 8,430,377 B2 * | 4/2013 | Borsatti | ............ | F16K 31/0655 251/129.15 |
| 8,500,087 B2 * | 8/2013 | Cheng | ............ | F16K 31/404 251/129.15 |
| 8,998,167 B2 * | 4/2015 | Leidig | ............ | F16K 31/0655 251/129.02 |
| 9,052,026 B2 * | 6/2015 | Leidig | ............ | F16K 31/0655 |
| 9,163,744 B2 * | 10/2015 | Fukano | ............ | F16K 31/0655 |
| 9,353,881 B2 * | 5/2016 | Chang | ............ | F16K 31/0672 |
| 9,404,601 B2 * | 8/2016 | Yoshida | ............ | F16K 31/0655 |
| 9,500,291 B2 * | 11/2016 | Pifer | ............ | F16K 39/024 |
| 9,508,476 B2 * | 11/2016 | Kouketsu | ............ | H01F 5/00 |
| 9,684,310 B2 * | 6/2017 | Haller | ............ | G05D 7/0623 |
| 9,874,290 B2 * | 1/2018 | Kato | ............ | F16K 31/0655 |
| 9,885,421 B2 * | 2/2018 | Morgan | ............ | F16K 31/12 |
| 10,006,412 B2 * | 6/2018 | Park | ............ | F02M 25/0836 |
| 10,155,126 B2 * | 12/2018 | Schwobe | ............ | A62C 37/10 |
| 10,167,971 B2 * | 1/2019 | Fletcher | ............ | F16K 24/04 |
| 2002/0070370 A1 * | 6/2002 | Fukano | ............ | F16K 31/0655 251/129.04 |
| 2003/0197143 A1 * | 10/2003 | Kai | ............ | F02M 25/0836 251/129.17 |
| 2005/0061302 A1 * | 3/2005 | Tatsu | ............ | F02M 25/0836 123/520 |
| 2005/0098748 A1 * | 5/2005 | Suzuki | ............ | F16K 7/14 251/57 |
| 2010/0252757 A1 * | 10/2010 | Birkelund | ............ | F16K 31/0655 251/65 |
| 2012/0097881 A1 * | 4/2012 | Aoyama | ............ | F16K 1/425 251/359 |
| 2015/0233487 A1 * | 8/2015 | Matsumoto | ............ | F16K 27/029 251/129.15 |
| 2017/0114913 A1 * | 4/2017 | Pearson | ............ | E03B 7/071 |
| 2017/0248248 A1 * | 8/2017 | Koyama | ............ | F16K 31/0655 |
| 2017/0284555 A1 * | 10/2017 | Sisk | ............ | F16K 31/0675 |
| 2017/0350535 A1 * | 12/2017 | Jameson | ............ | F16K 37/0083 |
| 2017/0370754 A1 * | 12/2017 | Croteau | ............ | F16K 17/36 |
| 2018/0003317 A1 * | 1/2018 | Iguchi | ............ | F16K 1/36 |
| 2018/0073657 A1 * | 3/2018 | Jung | ............ | F16F 7/095 |
| 2018/0156353 A1 * | 6/2018 | Jin | ............ | F16K 31/1635 |
| 2019/0078701 A1 * | 3/2019 | Bergfeld | ............ | F16K 1/36 |
| 2019/0170047 A1 * | 6/2019 | Venekamp | ............ | F16K 31/0672 |
| 2019/0186650 A1 * | 6/2019 | Asai | ............ | F16K 27/0236 |
| 2019/0277422 A1 * | 9/2019 | Strasswiemer | ............ | F16K 31/0655 |

* cited by examiner

SOLENOID VALVE FOR IRRIGATION SYSTEMS

FIELD OF THE INVENTION

The present invention relates to a solenoid valve for irrigation systems and more particularly to a power-saving solenoid valve for irrigation systems.

BACKGROUND OF THE INVENTION

Referring to FIGS. 8 and 9, a conventional solenoid valve for irrigation systems comprises a connecting tube (50), a valve piece (60) and a solenoid valve (70). The connecting tube (50) has a water inlet tube (52) and a water outlet tube (53), and a valve tube (51) is formed therebetween and configured to separate the water inlet tube (52) and the water outlet tube (53). The valve piece (60) installed in the valve tube (51) is configured to control water flow passing from the water inlet tube (52) to the water outlet tube. The solenoid valve (70) has a magnetic member (71) installed therein, and a metal plate (72) is installed at an end of the solenoid valve (70) which is located away from the valve piece (60). Moreover, the valve piece (60) is connected to a metal ring (61). When the solenoid valve (70) is energized to generate magnetic field which pushes the magnetic member (71) to bear against the valve piece (60), the valve piece (60) is configured to tightly press the valve tube (51) so as to stop water flowing from the water inlet tube (52) to the water outlet tube (53). Meanwhile, the magnetic member (71) is adapted to stick to the metal ring (61) of the valve piece (60). On the other hand, when reverse current is provided to pass through the solenoid valve (70), the magnetic member (71) is configured to detach from the valve piece (60) and to move toward and stick to the metal plate (72) of the solenoid valve (70) so as to enable water to flow from the water inlet tube (52) to the water outlet tube (53).

However, the conventional solenoid valve for irrigation systems is disadvantageous because: (i) the metal ring (61) and the metal plate (72) are respectively arranged adjacent to two ends of the magnetic member (71), and in order to prevent the valve piece (60) from simultaneously attracting both the metal ring (61) and the metal plate (72), the shifting distances between the metal ring (61) and the magnetic member (71) and between the metal plate (72) and the magnetic member (71) need to be increased, which prolongs the on/off switch time of the solenoid valve (70); (ii) electricity is needed not only in detaching the magnetic member (71) from the metal ring (61) or the magnetic member (71) but also in pushing the valve piece (60) between the metal ring (61) and the metal plate (72), which consumes large amount of power; and (iii) the metal ring (61) of the valve piece (60) which is soaked in water is prone to get rusty thereby reducing the quality of spraying water and leading to the damage of the valve piece (60). Therefore, there remains a need for a new and improved design for a solenoid valve for irrigation systems to overcome the problems presented above.

SUMMARY OF THE INVENTION

The present invention provides a solenoid valve for irrigation systems which comprises a gardening tube, a plastic valve piece, a cover and a magnetic member. The gardening tube has a water inlet channel and a water outlet channel which are communicated with each other, and a valve tube vertically extending from the gardening tube has a valve chamber. Moreover, a vertical first connecting tube is formed inside the valve tube. The water inlet channel and the water outlet channel are respectively communicated with an outside and an inside of the first connecting tube, and the water inlet channel and the water outlet channel are communicated with the valve chamber. Furthermore, a first annular groove is formed on an inner wall of the valve tube. The valve piece comprises a water stopper, a flexible ring and a locating ring which are sequentially coupled and arranged radially outward from a center of the valve piece. The valve piece is positioned in the valve chamber of the valve tube, and the locating ring is coupled into the first annular groove. The flexible ring is configured to enable the water stopper of the valve piece to be shifted to bear against the first connecting tube.

The cover is configured to cover the valve tube, and a second connecting tube vertically protrudes from the cover. The second connecting tube has a housing communicated with the valve chamber, and a solenoid coil and a metal ring are respectively disposed on an outer periphery of the second connecting tube. Moreover, the second connecting tube is connected to a first cap to secure positions of the solenoid coil and the metal ring. The magnetic member has a magnet installed therein, and the magnet has a first magnetic surface and a second magnetic surface at two ends thereof. The magnetic member is configured to be positioned in the housing of the cover, and the first magnetic surface of the magnet is configured to face to the valve piece. The energized solenoid coil is adapted to generate a forward magnetic field or a reverse magnetic field to move the magnetic member in the housing. When the magnetic member is moved away from the valve piece, water pressure from the water inlet channel is configured to push away the valve piece so as to enable the water inlet channel and the water outlet channel to be communicated. Also, when the valve piece is pushed, the magnetic member with the magnet is moved, which enables the first magnetic surface gets closer to the metal ring while the second magnetic surface gets away from the metal ring. Thus, the magnetic attraction between the first magnetic surface and the metal ring, which is stronger than the magnetic attraction between the second magnetic surface and the metal ring, is configured to move and hold a position of the magnetic member, wherein the first magnetic surface of the magnet is located at a center portion of the metal ring. On the other hand, when the magnetic member is moved to bear against the valve piece, the water stopper of the valve piece is configured to block the first connecting tube, which prevents water from flowing between the water inlet channel and the water outlet channel. Also, when the magnetic member is moved, similarly, the metal ring is located closer to the second magnetic surface of the magnet than the first magnetic surface thereof such that the magnetic attraction between the second magnetic surface and the metal ring is adapted to move and hold a position of the magnetic member, wherein the second magnetic surface of the magnet is located at the center portion of the metal ring.

In one embodiment, the metal ring is installed between the cover and the solenoid coil, and the magnetic member comprises a bottom shell and a top cap which are configured to couple together to secure a position of magnet; the bottom shell has a top opening which has a diameter smaller than the bottom shell; the magnet is positioned in the top cap, and a bottom portion of the magnet is borne against the top opening of the bottom shell, and the metal ring disposed on the second connecting tube of the cover is located a position between the first magnetic surface and the second magnetic surface of the magnet.

In another embodiment, the metal ring is installed between the solenoid coil and the first cap, and the magnetic member comprises a bottom shell and a top cap which are configured to couple together to secure the magnet in the bottom shell, and the metal ring disposed on the second connecting tube of the cover is located a position between the first magnetic surface and the second magnetic surface of the magnet.

In still another embodiment, the bottom shell and the top cap are glued together or are secured together in a method of high-frequency lamination.

In a further embodiment, the water stopper has a vertical through hole, and a pointed head protruding from a lower end of the bottom shell is configured to abut against the through hole, and the through hole is configured to be passed through by water flow.

In still a further embodiment, a non-metal ring is formed inside the water stopper to improve the hardness of the water stopper so as to enable the water stopper to evenly press against the first connecting tube.

In a preferred embodiment, the non-metal ring is made of plastic, ceramic, glass or acrylic.

In another preferred embodiment, an opening of the first connecting tube has an annular cutting edge which is configured to couple with the water stopper to achieve sealing effect between the first connecting tube and the water stopper.

In a particular embodiment, an end of the cover adjacent to the valve tube has a first ring body extending toward the valve tube, and the first ring body is configured to be inserted into the valve chamber of the valve tube to abut against the locating ring of the valve piece so as to secure a position of the valve piece.

In another particular embodiment, a second annular groove is formed on a periphery of an opening of the valve chamber, and the cover comprises a second ring body protruding toward the valve tube, wherein the second ring body is configured to connect to and secure with the second annular groove through a method of high-frequency lamination.

Comparing with conventional solenoid valve for irrigation systems, the present invention is advantageous because: (i) with magnetic attraction between the first magnetic surface and the metal ring or between the second magnetic surface and the metal ring, the magnetic member can be moved with less electricity and achieve fast on/off switch of the solenoid valve; and (ii) there is no need to install additional metal pieces on the water stopper or on the second connecting tube, which avoids contaminating spraying water and reduces the costs of manufacture.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
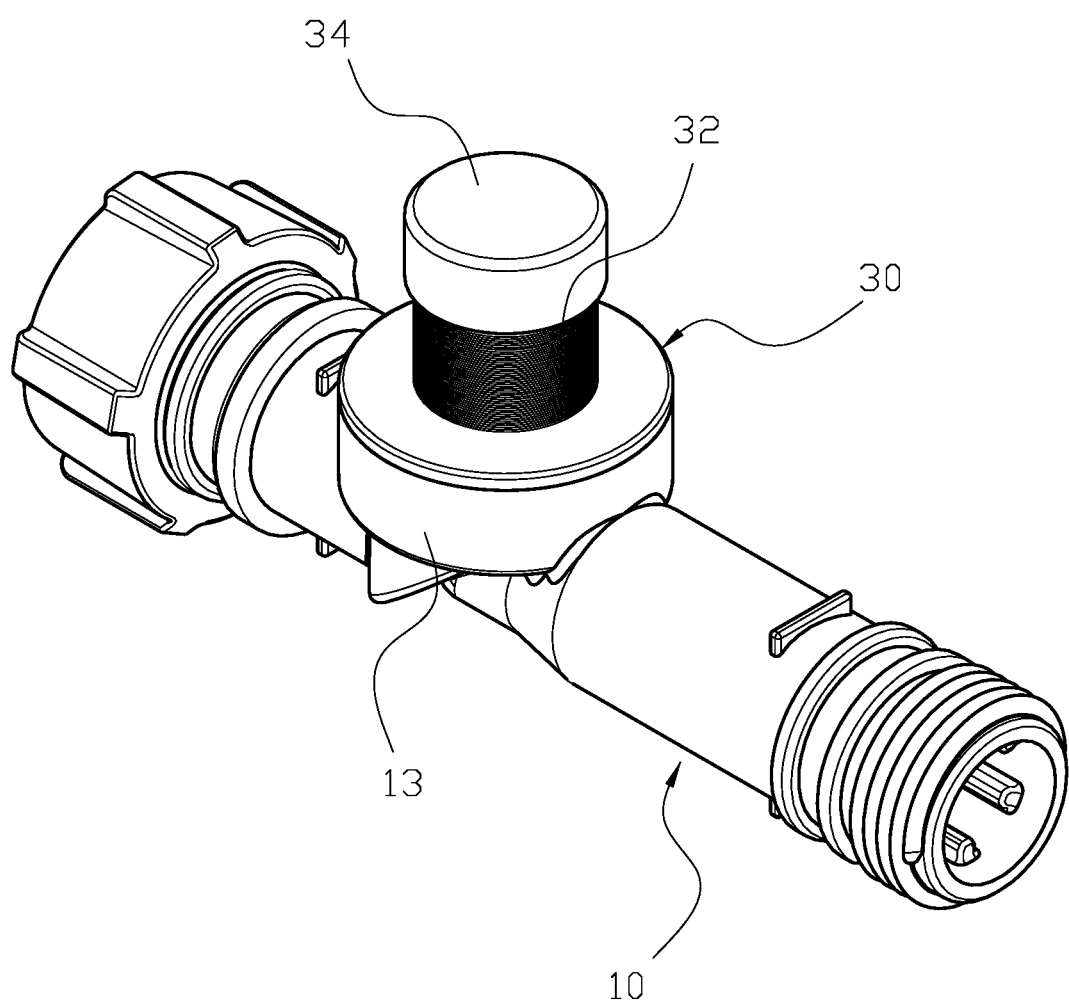
FIG. 1 is a three-dimensional assembly view of a solenoid valve for irrigation systems of the present invention.
Figure 2:
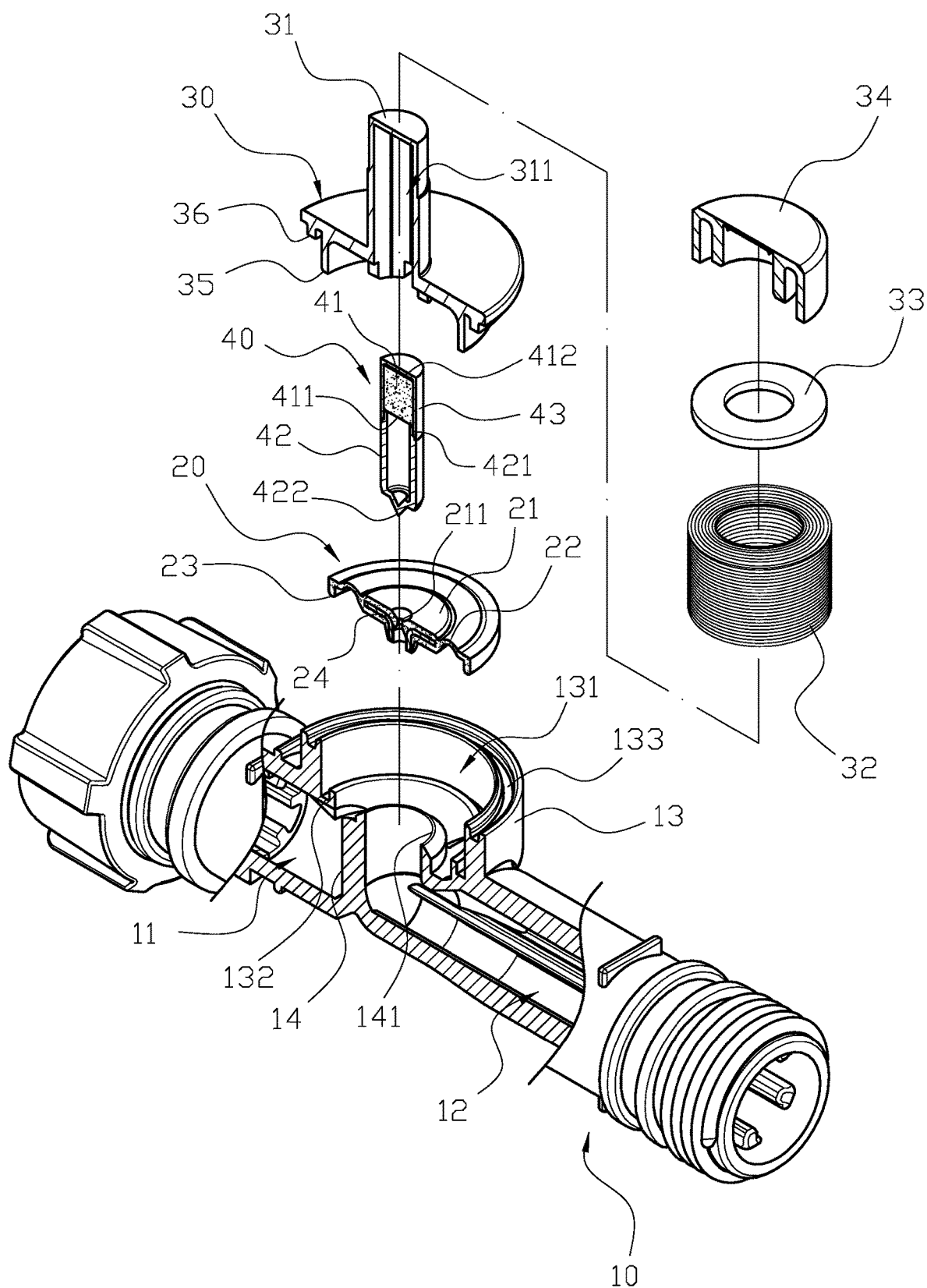
FIG. 2 is a three-dimensional exploded view of the solenoid valve of the present invention.
Figure 3:
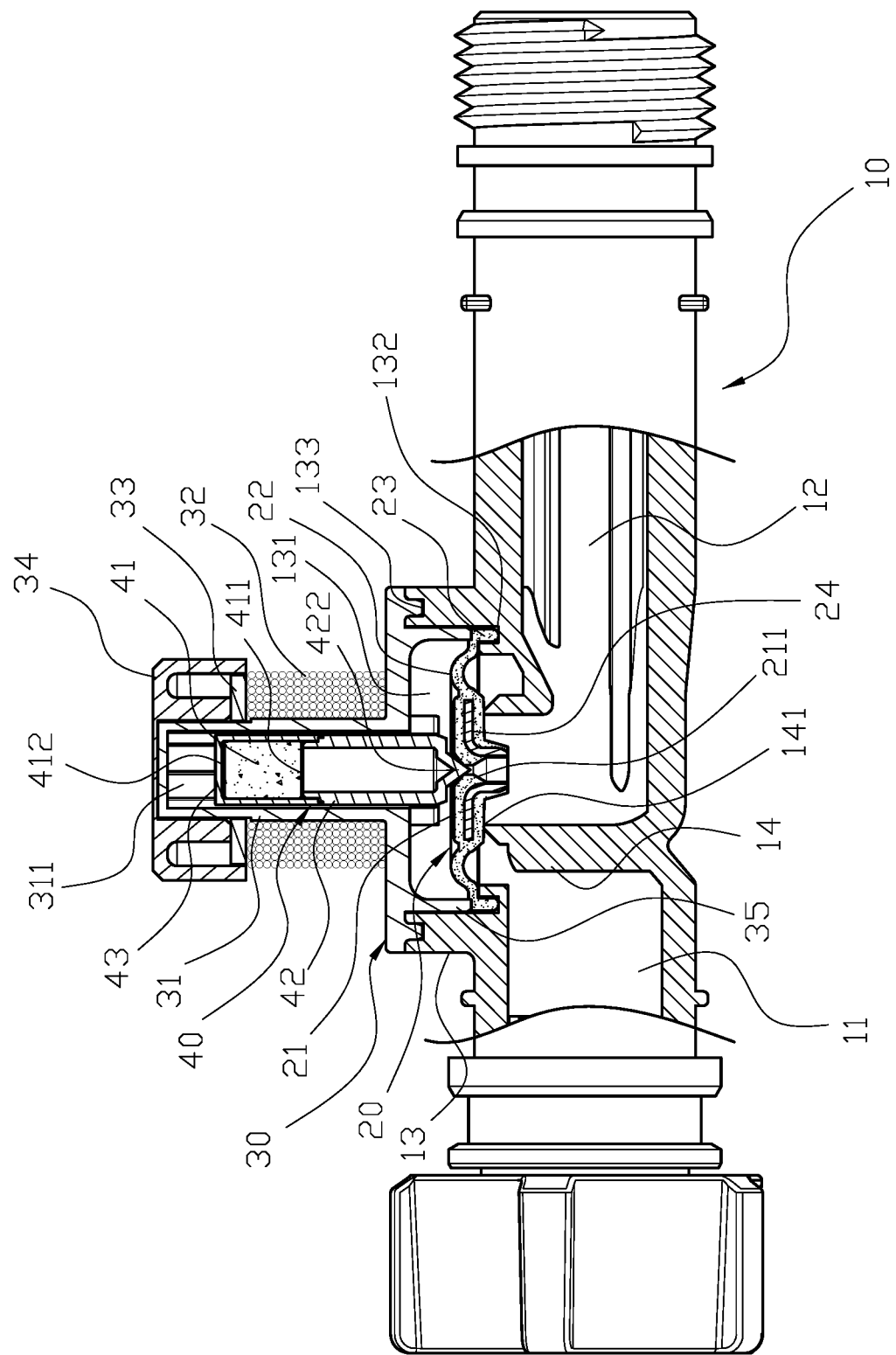
FIG. 3 is a detailed sectional view of the solenoid valve of the present invention.
Figure 4:
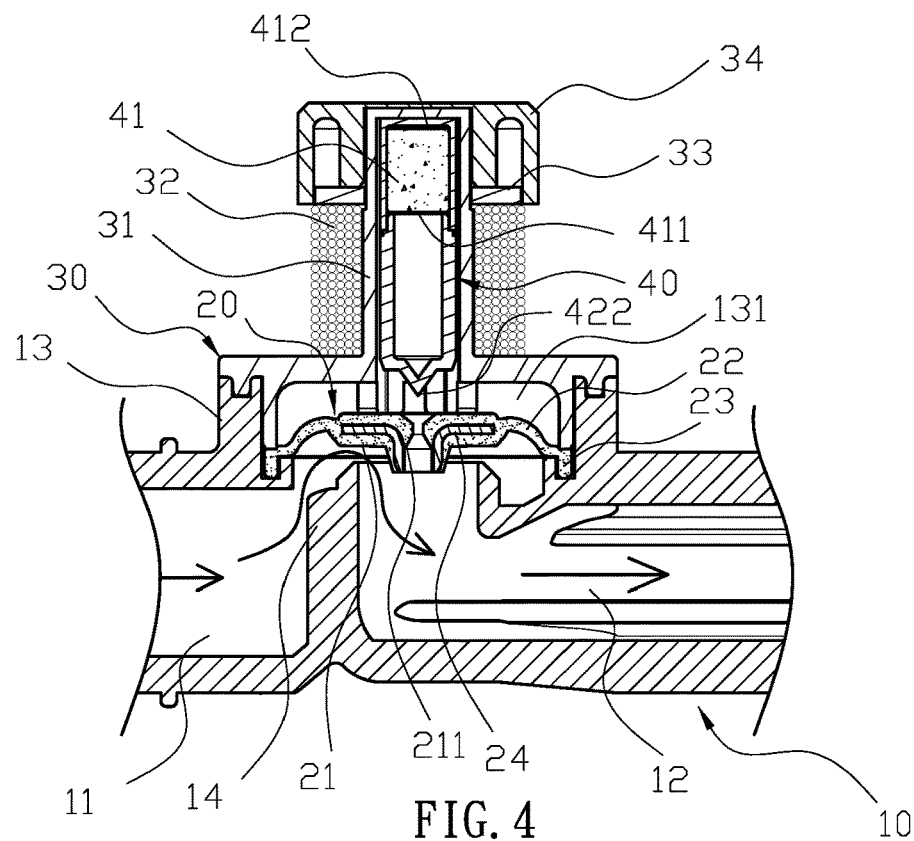
FIG. 4 is a schematic view of the solenoid valve of the present invention when a water inlet channel and a water outlet channel of a gardening tube are communicated and water flows therethrough.
Figure 5:
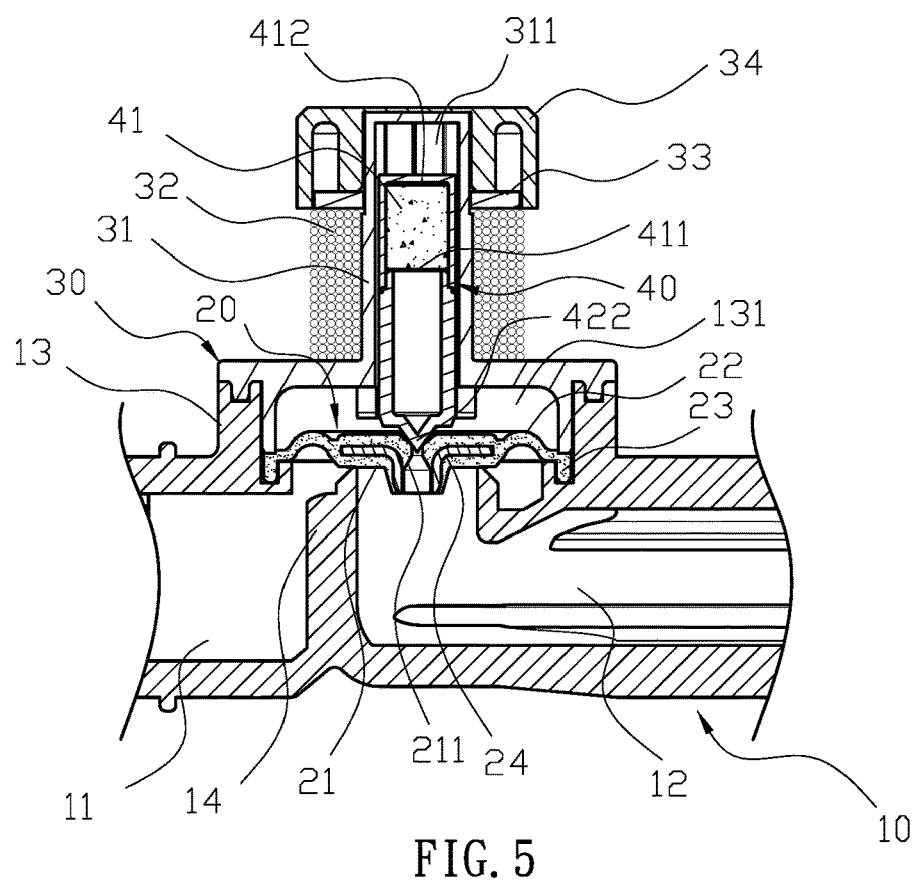
FIG. 5 is a schematic view illustrating the communication between the water inlet channel and the water outlet channel of the solenoid valve is blocked by a water stopper in the present invention.

In order to further understand the goal, characteristics and effect of the present invention, a number of embodiments along with the drawings are illustrated as following:

Referring to FIGS. 1 to 3, the present invention provides a solenoid valve for irrigation systems which comprises a gardening tube (10), a plastic valve piece (20), a cover (30) and a magnetic member (40). The gardening tube (10) has a water inlet channel (11) and a water outlet channel (12) which are communicated with each other, and a valve tube (13) vertically extending from the gardening tube (10) has a valve chamber (131). Moreover, a vertical first connecting tube (14) is formed inside the valve tube (13). The water inlet channel (11) and the water outlet channel (12) are respectively communicated with an outside and an inside of the first connecting tube (14), and the water inlet channel (11) and the water outlet channel (12) are communicated with the valve chamber (131). Furthermore, a first annular groove (132) is formed on an inner wall of the valve tube (13). The valve piece (20) comprises a water stopper (21), a flexible ring (22) and a locating ring (23) which are sequentially coupled and arranged radially outward from a center of the valve piece (20). The valve piece (20) is positioned in the valve chamber (131) of the valve tube (13), and the locating ring (23) is coupled into the first annular groove (132). The flexible ring (22) is configured to enable the water stopper (21) of the valve piece (20) to be shifted to bear against the first connecting tube (14). A non-metal ring (24) is formed inside the water stopper (21) to improve the hardness of the water stopper (21) so as to enable the water stopper (21) to evenly press against the first connecting tube (14), wherein the non-metal ring (24) is made of plastic, ceramic, glass or acrylic. Also, an opening of the first connecting tube (14) has an annular cutting edge (141) which is configured to couple with the water stopper (21) to achieve sealing effect between the first connecting tube (14) and the water stopper (21).

In addition, the cover (30) is configured to cover the valve tube (13), and a second connecting tube (31) vertically protrudes from the cover (30). The second connecting tube (31) has a housing (311) communicated with the valve chamber (131), and a solenoid coil (32) and a metal ring (33) are respectively disposed on an outer periphery of the second connecting tube (31). Moreover, the second connecting tube (31) is connected to a first cap (34) to secure positions of the solenoid coil (32) and the metal ring (33). The metal ring (33) is positioned between the cover (30) and the solenoid coil (32), and an end of the cover (30) adjacent to the valve tube (13) has a first ring body (35) extending toward the valve tube (13). Additionally, the first ring body (35) is configured to be inserted into the valve chamber (131) of the valve tube (13) to abut against the locating ring (23) of the valve piece (20) so as to secure a position of the valve piece (20). A second annular groove (133) is formed on a periphery of an opening of the valve chamber (131), and the cover (30) comprises a second ring body (36) protruding toward the valve tube (13), wherein the second ring body (36) is configured to connect to and secure with the second annular groove (133) through a method of high-frequency lamination. The magnetic member (40) has a magnet (41) installed therein, and the magnet (41) has a first magnetic surface (411) and a second magnetic surface (412) at two ends thereof. The magnetic member (40) further comprises a bottom shell (42) and a top cap (43) which are configured to couple together to secure a position of magnet (41), and the bottom shell (42) has a top opening (421) which has a diameter smaller than the bottom shell (42). The magnet (41) is positioned in the top cap (43), and a bottom portion of the magnet (41) is borne against the top opening (421) of the bottom shell (42). Also, the first magnetic surface (411) of the magnet (41) is faced to the bottom shell (42). The magnetic member (40) is configured to be positioned in the housing (311) of the cover (30), and the metal ring (33) disposed on the second connecting tube (31) of the cover (30) is located a position between the first magnetic surface (411) and the second magnetic surface (412). Moreover, the water stopper (21) has a vertical through hole (211), and a pointed head (422) protruding from a lower end of the bottom shell (42) is configured to abut against the through hole (211). Furthermore, the through hole (211) is configured to be passed through by water flow.

When the magnetic (40) is put into the housing (311) of the cover (30), the first magnetic surface (411) of the magnet (41) is configured to face to the valve piece (20), and the energized solenoid coil (32) is adapted to generate a forward magnetic field or a reverse magnetic field to move the magnetic member (40) in the housing (311). When the magnetic member (40) is moved away from the valve piece (20), water pressure from the water inlet channel (11) is configured to push away the valve piece (20) so as to enable the water inlet channel (11) and the water outlet channel (12) to be communicated. Also, when the valve piece (20) is pushed, the magnetic member (40) with the magnet (41) is moved, which enables the first magnetic surface (411) gets closer to the metal ring (33) while the second magnetic surface (412) gets away from the metal ring (33). Thus, the magnetic attraction between the first magnetic surface (411) and the metal ring (33), which is stronger than the magnetic attraction between the second magnetic surface (412) and the metal ring (33), is configured to move and hold a position of the magnetic member (40), wherein the first magnetic surface (411) of the magnet (41) is located at a center portion of the metal ring (33). On the other hand, when the magnetic member (40) is moved to bear against the valve piece (20), the water stopper (21) of the valve piece (20) is configured to block the first connecting tube (14), which prevents water from flowing between the water inlet channel (11) and the water outlet channel (12). Also, when the magnetic member (40) is moved, similarly, the metal ring (33) is located closer to the second magnetic surface (412) of the magnet (41) than the first magnetic surface (411) thereof such that the magnetic attraction between the second magnetic surface (412) and the metal ring (33) is adapted to move and hold a position of the magnetic member (40), wherein the second magnetic surface (412) of the magnet (41) is located at the center portion of the metal ring (33).

Structurally, referring to FIGS. 1 to 3, the valve piece (20) is positioned into the valve tube (13) of the gardening tube (10), and the locking ring (23) of the valve piece (20) is connected to the first annular groove (132) of the valve tube (13). Also, the water stopper (21) of the valve piece (20) is configured to block the first connecting tube (14), and the through hole (211) of the water stopper (21) is adapted to communicate with the water outlet channel (12). Moreover, the flexible ring (22) of the valve piece (20) blocks water from flowing between the water inlet channel (11) and the valve chamber (131). The solenoid coil (32) and the metal ring (33) are respectively disposed on the second connecting tube (31) of the cover (30) in sequence, and the positions of the solenoid coil (32) and the metal ring (33) are secured by the first cap (34) coupled with the second connecting tube (31). The magnetic member (40) has the top cap (43) to accommodate the magnet (41) therein, and the bottom shell (42) is coupled with the top cap (43) to enable the magnet (41) to bear against the top opening (421) of the bottom shell (42), thereby securing the magnet (41) in the top cap (43). The first magnetic surface (411) of the magnet (41) is faced to the pointed head (422) of the bottom shell (42) while the second magnetic surface (412) thereof is faced to an opposite direction. The magnetic member (40) is positioned in the housing (311) of the second connecting tube (31), and the cover (30) is configured to cover the valve tube (13) of the gardening tube (10). The first ring body (35) of the cover (30) is inserted into the valve chamber (131) to bear against the locating ring (23) of the valve piece (20), thereby securing the valve piece (20) between the first annular groove (132) and the first ring body (35). Moreover, the second ring body (36) of the cover (30) is engaged with the second annular groove (133) of the valve tube (13) to connect the cover (30) to the valve tube (13), and the magnetic member (40) is configured to move in the housing (311) and the valve chamber (131). It is worth noting that no matter where the magnetic member (40) is moved and located, the fixed metal ring (33) is located at a position between the first magnetic surface (411) and the second magnetic surface (412) of the magnet (41).

In actual application, referring to FIGS. 2 to 5, the gardening tube (10) is configured to connect to a water source to achieve automatic or controllable gardening irrigation, wherein the water inlet channel (11) of the gardening tube (10) is connected to the water source while the water outlet channel (12) thereof is connected to a water-spraying end. The metal ring (33) is disposed on the second connecting tube (31), and the magnetic member (40) having the magnet (41) is slidably installed in the housing (311) of the second connecting tube (31). Moreover, the metal ring (33) is located at a position between the first magnetic surface (411) and the second magnetic surface (412) of the magnet (41). When the solenoid coil (32) is not energized, because of the magnetic attraction, the magnet (41) is prone to move to either of two positions where the first magnetic surface (411) is located at the center portion of the metal ring (33) or the second magnetic surface (412) is located at the center portion of the metal ring (33). In case that the magnetic member (40) is moved until the first magnetic surface (411) of the magnet (41) is located at the center portion of the metal ring (33), wherein the magnetic member (40) is moved into an inner space of the housing (311), and the pointed head (422) of the magnetic member (40) is moved away from the valve piece (20). By this time, the through hole (211) of the valve piece (20) is configured to balance the pressure between the valve chamber (131) and the water outlet channel (12). Thus, the water pressure from the water inlet channel (11) is configured to push away the flexible ring (22) of the valve piece (20), and the water stopper (21) is moved to enable water to flow from the water inlet channel (11) to the water outlet channel (12). The water flow can be cut off when the solenoid coil (32) is energized to generate the magnetic field which pushes the magnetic member (40) toward the valve piece (20). Since either of the first magnetic surface (411) or the second magnetic surface (412) closer to the metal ring (33) can have stronger magnetic attraction with the metal ring (33), the solenoid coil (32) only needs to generate a magnetic force which is sufficient to push the first magnetic surface (411) away from the metal ring (33), and the second magnetic surface (412) at a position closer to the metal ring (33) than the first magnetic surface (411) to the metal ring (33) is configured to have greater magnetic attraction with the metal ring (33), thereby moving the magnetic member (40) toward the valve piece (20) until the second magnetic surface (412) is located at the center portion of the metal ring (33). By this time, the pointed head (422) of the magnetic member (40) is configured to bear against the through hole (211) of the valve piece (20), and the water stopper (21) is pushed to bear against the annular cutting edge (141) of the first connecting tube (14), thereby blocking water from flowing between the water inlet channel (11) and the water outlet channel (12). On the contrary, similarly, when the solenoid coil (32) energized by a reverse current to generate a reverse magnetic field, the magnetic member (40) is moved away from the valve piece (20), and once at a position closer to the metal ring (33) than the second magnetic surface (412), the first magnetic surface (411) is configured to have magnetic attraction with the metal ring (33), and there is no need to further electricity that the magnetic member (40) is moved by magnetic attraction between the first magnetic surface (411) and the metal ring (33) until the first magnetic surface (411) is moved and located at the center portion of the metal ring (33). Also, when the magnetic member (40) is moved away from the valve piece (20), the water stopper (21) is moved by water pressure to enable water to flow from the water inlet channel (11) to the water outlet channel (12). With magnetic attraction between the first magnetic surface (411) and the metal ring (33) or between the second magnetic surface (412) and the metal ring (33), the magnetic member (40) can be moved with less electricity.

Figure 6:
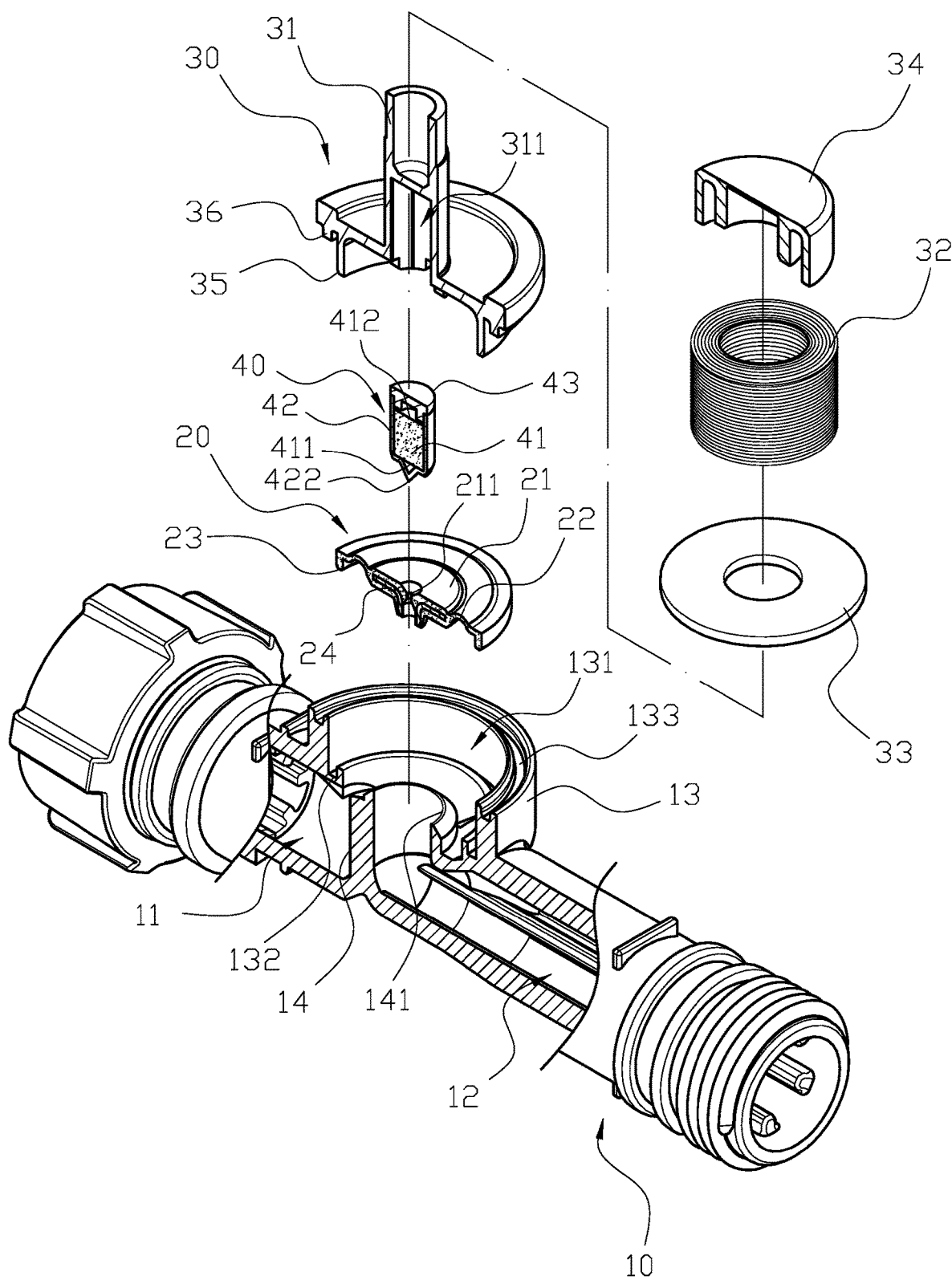
FIG. 6 is a three-dimensional exploded view of another embodiment of the solenoid valve of the present invention.
Figure 7:
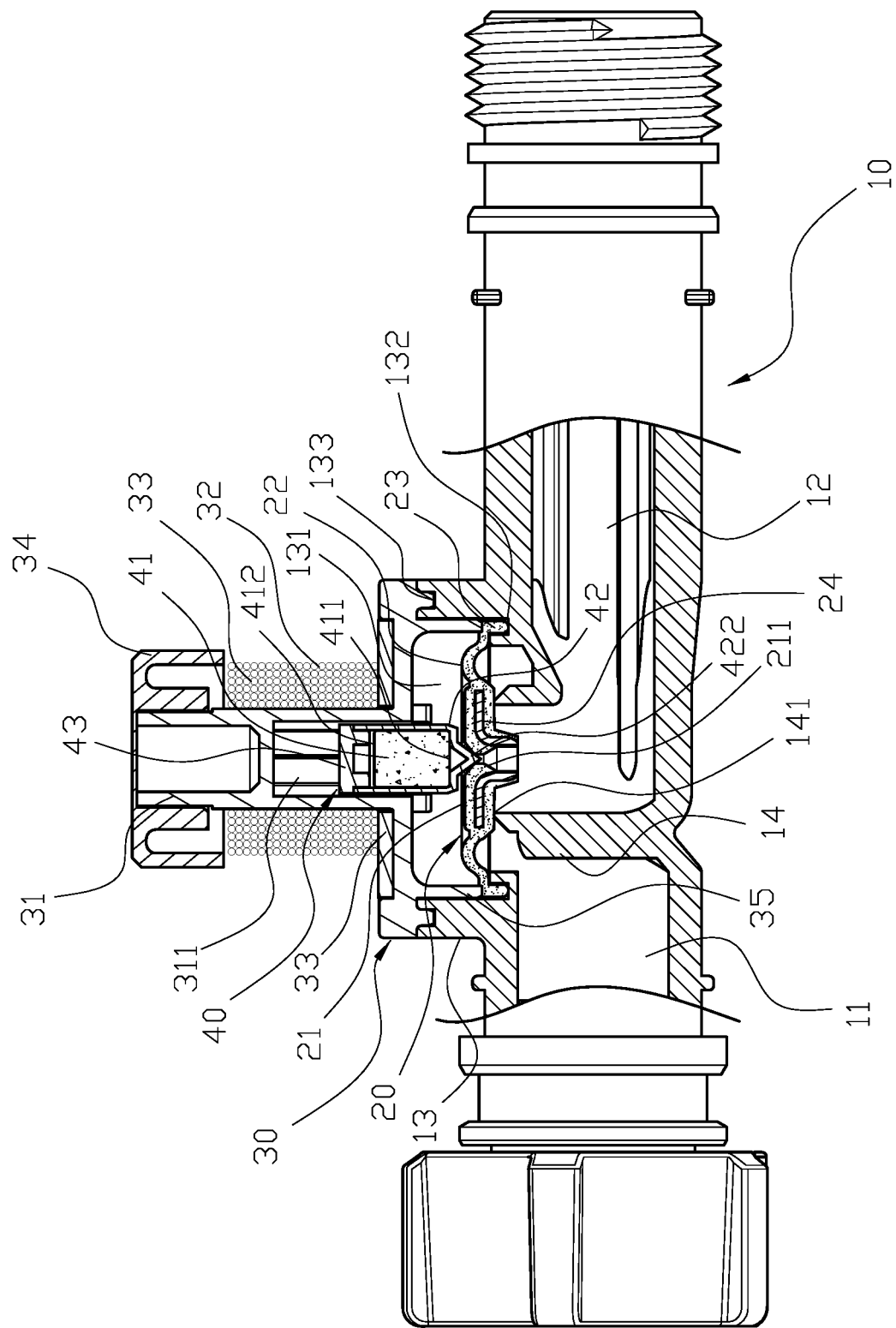
FIG. 7 is a detailed sectional view of another embodiment of the solenoid valve of the present invention.
Figure 8:
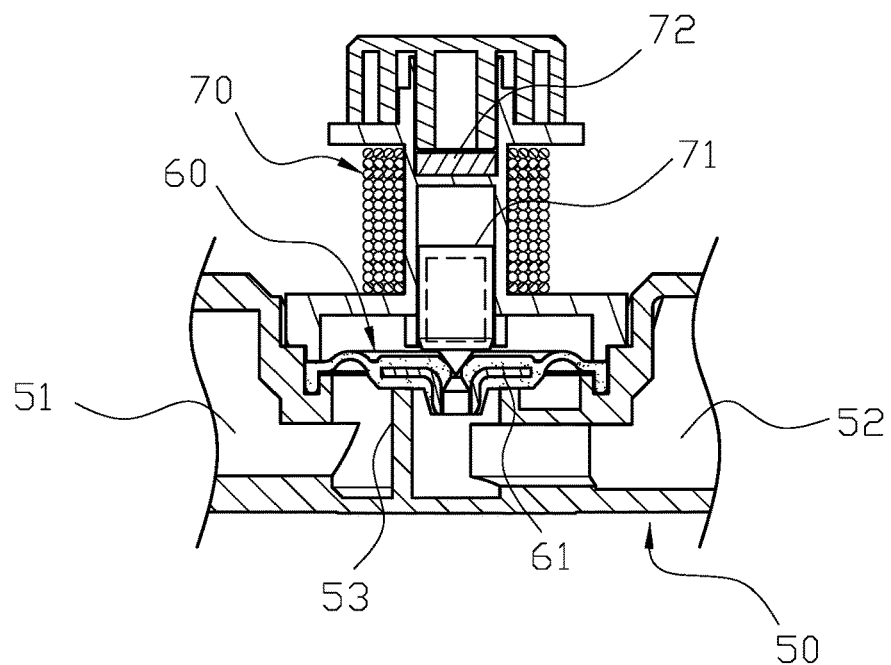
FIG. 8 is a prior art.
Figure 9:
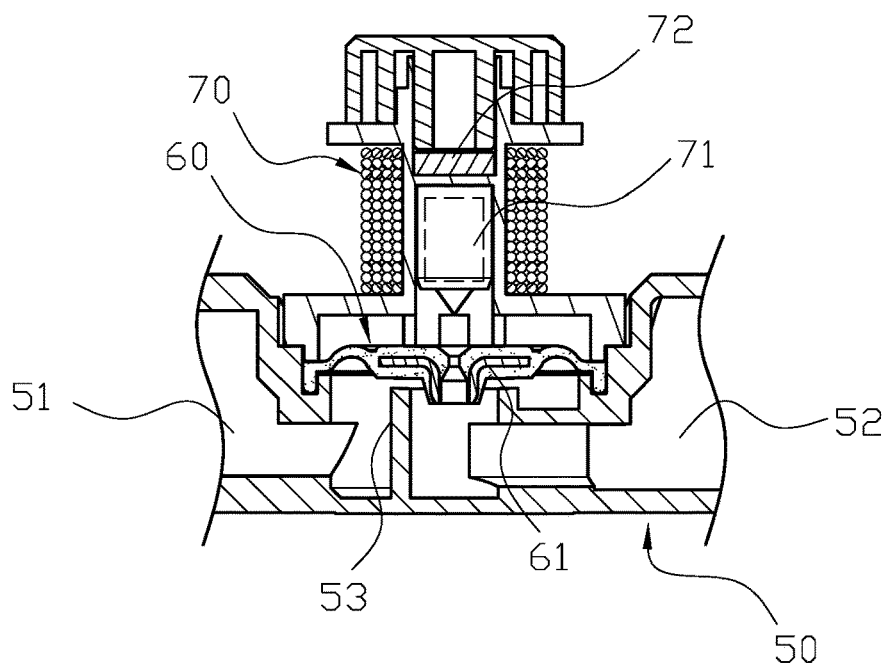
FIG. 9 is a prior art.

In one embodiment, referring to FIGS. 6 to 8, the metal ring (33) is installed between the solenoid coil (32) and the first cap (34), and the magnetic member (40) has the bottom shell (42) and the top cap (43) to secure the magnet (41) in the bottom shell (42), and the metal ring (33) disposed on the second connecting tube (31) of the cover (30) is located a position between the first magnetic surface (411) and the second magnetic surface (412) of the magnet (41).

More specifically, referring to FIGS. 1 to 5, the gardening tube (10) has the valve tube (13) between the water inlet channel (11) and the water outlet channel (12), and the valve piece (20) is installed in the valve tube (13) to block water from flowing between the water inlet channel (11) and the water outlet channel (12). Also, the magnetic member (40) having the magnet (41) is slidably installed in the second connecting tube (31) of the cover (30), and the solenoid coil (32) and the metal ring (33) are respectively disposed on the second connecting tube (31).

Comparing with conventional solenoid valve for irrigation systems, the present invention is advantageous because: (i) with magnetic attraction between the first magnetic surface (411) and the metal ring (33) or between the second magnetic surface (412) and the metal ring (33), the magnetic member (40) can be moved with less electricity and achieve fast on/off switch of the solenoid valve; and (ii) there is no need to install additional metal pieces on the water stopper (21) or on the second connecting tube (31), which avoids contaminating spraying water and reduces the costs of manufacture.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A solenoid valve for irrigation systems comprising:
a gardening tube having a water inlet channel and a water outlet channel which are communicated with each other, and a valve tube, which vertically extends from the gardening tube, having a valve chamber; a vertical first connecting tube formed inside the valve tube; the water inlet channel and the water outlet channel respectively communicated with an outside and an inside of the first connecting tube, and the water inlet channel and the water outlet channel communicated with the valve chamber; a first annular groove formed on an inner wall of the valve tube;
a plastic valve piece comprising a water stopper, a flexible ring and a locating ring which are sequentially coupled and arranged radially outward from a center of the valve piece; the valve piece positioned in the valve chamber of the valve tube, and the locating ring coupled into the first annular groove; the flexible ring configured to enable the water stopper of the valve piece to be shifted to bear against the first connecting tube;
a cover configured to cover the valve tube, and a second connecting tube vertically protruding from the cover; the second connecting tube having a housing communicated with the valve chamber, and a solenoid coil and a metal ring respectively disposed on an outer periphery of the second connecting tube; the second connecting tube connected to a first cap to secure positions of the solenoid coil and the metal ring; and
a magnetic member having a magnet installed therein, and the magnet comprising a first magnetic surface and a second magnetic surface at two ends thereof; the magnetic member configured to be positioned in the housing of the cover, and the first magnetic surface of the magnet adapted to face to the valve piece; the energized solenoid coil configured to generate a forward magnetic field or a reverse magnetic field to move the magnetic member in the housing; when the magnetic member moved away from the valve piece, water pressure from the water inlet channel configured to push away the valve piece so as to enable the water inlet channel and the water outlet channel to be communicated, and when the valve piece pushed, the magnetic member with the magnet moved, which enables the first magnetic surface to be located closer to the metal ring than the second magnetic surface to the metal ring, and the magnetic attraction between the first magnetic surface and the metal ring, which is stronger than the magnetic attraction between the second magnetic surface and the metal ring, configured to move and hold a position of the magnetic member, wherein the first magnetic surface of the magnet is located at a center portion of the metal ring; when the magnetic member moved to bear against the valve piece, the water stopper of the valve piece configured to block the first connecting tube, which prevents water from flowing between the water inlet channel and the water outlet channel, and the metal ring located closer to the second magnetic surface of the magnet than the first magnetic surface thereof such that the magnetic attraction between the second magnetic surface and the metal ring adapted to move and hold a position of the magnetic member, wherein the second magnetic surface of the magnet is located at the center portion of the metal ring.

2. The solenoid valve for irrigation systems of claim 1, wherein the metal ring is installed between the cover and the solenoid coil, and the magnetic member comprises a bottom shell and a top cap which are configured to couple together to secure a position of magnet; the bottom shell has a top opening which has a diameter smaller than the bottom shell; the magnet is positioned in the top cap, and a bottom portion of the magnet is borne against the top opening of the bottom shell, and the metal ring disposed on the second connecting tube of the cover is located a position between the first magnetic surface and the second magnetic surface of the magnet.

3. The solenoid valve for irrigation systems of claim 1, wherein the metal ring is installed between the solenoid coil and the first cap, and the magnetic member comprises a bottom shell and a top cap which are configured to couple together to secure the magnet in the bottom shell, and the metal ring disposed on the second connecting tube of the cover is located a position between the first magnetic surface and the second magnetic surface of the magnet.

4. The solenoid valve for irrigation systems of claim 2, wherein the bottom shell and the top cap are glued together or are secured together in a method of high-frequency lamination.

5. The solenoid valve for irrigation systems of claim 2, wherein the water stopper has a vertical through hole, and a pointed head protruding from a lower end of the bottom shell is configured to abut against the through hole, and the through hole is configured to be passed through by water flow.

6. The solenoid valve for irrigation systems of claim 3, wherein the bottom shell and the top cap are glued together or are secured together in a method of high-frequency lamination.

7. The solenoid valve for irrigation systems of claim 3, wherein the water stopper has a vertical through hole, and a pointed head protruding from a lower end of the bottom shell is configured to abut against the through hole, and the through hole is configured to be passed through by water flow.

8. The solenoid valve for irrigation systems of claim 1, wherein a non-metal ring is formed inside the water stopper to improve the hardness of the water stopper so as to enable the water stopper to evenly press against the first connecting tube.

9. The solenoid valve for irrigation systems of claim 8, wherein the non-metal ring is made of plastic, ceramic, glass or acrylic.

10. The solenoid valve for irrigation systems of claim 8, wherein an opening of the first connecting tube has an annular cutting edge which is configured to couple with the water stopper to achieve sealing effect between the first connecting tube and the water stopper.

11. The solenoid valve for irrigation systems of claim 1, wherein an end of the cover adjacent to the valve tube has a first ring body extending toward the valve tube, and the first ring body is configured to be inserted into the valve chamber of the valve tube to abut against the locating ring of the valve piece so as to secure a position of the valve piece.

12. The solenoid valve for irrigation systems of claim 1, wherein a second annular groove is formed on a periphery of an opening of the valve chamber, and the cover comprises a second ring body protruding toward the valve tube, wherein the second ring body is configured to connect to and secure with the second annular groove through a method of high-frequency lamination.

\* \* \* \* \*